(12) United States Patent
Lin et al.

(10) Patent No.: US 8,252,342 B2
(45) Date of Patent: Aug. 28, 2012

(54) METHOD FOR PRODUCING COMPLEX OF METALLIC NANOPARTICLE AND INORGANIC CLAY AND ETHANOLAMINE PROMOTER

(75) Inventors: Jiang-Jen Lin, Taipei (TW); Yueh-Hsien Wu, Taipei (TW)

(73) Assignee: National Taiwan University, Taipei (TW)

( * ) Notice: Subject to any disclaimer, the term of this patent is extended or adjusted under 35 U.S.C. 154(b) by 109 days.

(21) Appl. No.: 12/826,533

(22) Filed: Jun. 29, 2010

(65) Prior Publication Data
US 2011/0001085 A1   Jan. 6, 2011

(30) Foreign Application Priority Data

Jul. 1, 2009   (TW) ............................. 98122335 A (51) Int. Cl.
*A01N 59/16* (2006.01)
*A01N 59/06* (2006.01)
*A01N 59/00* (2006.01)
*C01B 33/26* (2006.01)
*A61K 33/38* (2006.01)

(52) U.S. Cl. ........ 424/618; 423/326; 423/397; 424/684; 424/718; 977/773; 977/778; 977/783; 977/810

(58) Field of Classification Search .................. None
See application file for complete search history.

(56) References Cited

U.S. PATENT DOCUMENTS

| | | | | |
|---|---|---|---|---|
| 4,248,740 A | * | 2/1981 | Mitsuhata et al. | 502/348 |
| 2005/0115462 A1 | * | 6/2005 | Disalvo et al. | 106/403 |
| 2007/0003603 A1 | * | 1/2007 | Karandikar et al. | 424/443 |
| 2010/0065789 A1 | * | 3/2010 | Sato | 252/514 |

* cited by examiner

*Primary Examiner* — Ernst Arnold
(74) *Attorney, Agent, or Firm* — Pai Patent & Trademark Law Firm; Chao-Chang David Pai (57) ABSTRACT

A method for producing a complex of metallic nanoparticles and inorganic clay and an organic promoter, wherein the organic promoter is ethanolamine, for example, monoethanolamine (MEA), diethanolamine (DEA) or triethanolamine (TEA). The metallic nanoparticles produced by this method can be stably and uniformly dispersed without adding other reducing agent or dispersant.

11 Claims, 6 Drawing Sheets

METHOD FOR PRODUCING COMPLEX OF METALLIC NANOPARTICLE AND INORGANIC CLAY AND ETHANOLAMINE PROMOTER

BACKGROUND OF THE INVENTION

1. Field of the Invention

The present invention relates to a method for producing a complex of metallic nanoparticles and inorganic clay and an organic promoter, and particularly to a method using ethanolamine as the organic promoter.

2. Related Prior Arts

It is known that silver nanoparticles (hereinafter abbreviated as AgNPs) are very effective in disinfection for six hundred kinds of bacteria. The AgNPs have higher specific areas than other metallic particles and thus more effective. The AgNPs are lower in toxicity and therefore suitable for massively-produced medicine.

Currently, the AgNPs can be produced by physical processes or chemical processes. For the physical processes, expensive pieces of equipment are usually needed to achieve high vacuum or electron beams. For the chemical processes including redox reactions, reducing agents for reducing silver ions into silver atoms are needed. The reducing agents can be sodium borohydride ($NaBH_4$), formaldehyde, ethanol, or hydrazine ($H_2N-NH_2$).

To control particle sizes, stabilizers such as sodium citrate, glucose, sodium dodecyl sulfate (SDS), polyvinylpyrrolidone (PVP) and dendrimer, can be added.

Particularly, concentrations of the silver ions have to be controlled in ppm ranges to avoid aggregation which will impair effects of the product. To solve this problem, continuous blending at a high temperature is required and organic solvents or surfactants are added. However, the organic solvents or surfactants may react with AgNPs to decrease surface areas thereof and result in environmental pollutions. Such processes are also difficult to operate and usually take a long time which will raise the costs.

In addition, dispersants or protective agents are usually added to improve stability and avoid aggregation through electrostatic rejection or steric hindrance. The dispersants can be water soluble polymers, for example, polyvinylpyrrolidone (PVP), polyvinylalcohol (PVA), polymethylvinylether, poly(acrylic acid) (PAA), nonionic surfactants, chelating agents, etc. Inorganic silicates, for example, natural layered clay, can also be used as inorganic dispersants to attract the silver nanoparticles to form complexes.

To improve the conventional processes, the present invention provides a method which is highly efficient and can be operated at lower temperatures.

SUMMARY OF THE INVENTION

The object of the present invention is to provide a method for producing a stable and uniform complex of metallic nanoparticle and inorganic clay without a need for high temperature or complex processes.

The method is to have a metal ionic compound, layered inorganic clay and an organic promoter undergo a reduction reaction at 20 to 80 degree C. for 0.5 to 24 hours. The organic promoter has a general formula:

$$(HOCH_2CH_2)_{3-x}N-(R)_x$$

wherein x=0, 1 or 2, R is H, alkyl or alkenyl of C1 to C18. The organic promoter is used to reduce the metal ions into metal atoms which then form metallic nanoparticles. The inorganic clay is preferably silicate clay, and the metallic particles are preferably gold, silver, copper or iron.

The reduction reaction is preferably performed at 25 to 50 degree C.

R is preferably methyl, ethyl, butyl or cyclohexanyl. Examples of the promoter include monoethanolamine (MEA), diethanolamine (DEA), triethanolamine (TEA), monopropanolamine, dipropanolamine and tripropanolamine. Methyl amine ethoxylates, butyl amine ethoxylates or fatty amine ethoxylates can be used, too. The organic promoter preferably has a concentration ranging between 5 wt % and 50 wt %.

The metallic ions are preferably silver ions, and thus the complex of metallic nanoparticle and inorganic clay is the complex of AgNPs and inorganic clay. Source of the silver ions can be silver nitrate, silver sulfate or silver halide. When silver nitrate is used, the weight ratio of silver nitrate to the inorganic clay preferably ranges between 1:100 and 1:2; and the weight ratio of silver nitrate to the organic promoter preferably ranges between 1:1 and 1:3. The metallic nanoparticles produced preferably have a spherical structure. The concentration of silver nitrate preferably ranges between 0.5 wt % and 5 wt %.

The inorganic clay can be montmorillonite (MMT), bentonite, laponite, sunthetical mica, kaolinite, talc, attapulgite clay, vermiculite or layered double hydroxides (LDH), preferably having an aspect ratio ranging 10 to 100,000, and more preferably 100 to 1,000. The clay preferably has a structure with a ratio of Si-tetrahedron:Al-octahedron of about 2:1. The cationic exchanging equivalent (CEC) of the clay usually ranges between 0.1 and 5.0 meq/g. The concentration of the clay is preferably controlled between 0.5 wt % and 5 wt %.

Ionic equivalent of the metallic particles and CEC of the clay preferably have a ratio ranging between 1 and 200.

BRIEF DESCRIPTION OF THE DRAWINGS

FIG. 2 shows the photographs of the silver mirrors generated from Comparative Examples 4 to 6 in which no dispersant was added in.

ATTACHMENT

Attachment 1 shows detailed procedure of Examples and Comparative Examples is described as follows and the operational conditions.

DETAILED DESCRIPTION OF THE PREFERRED EMBODIMENTS

Figure 1:
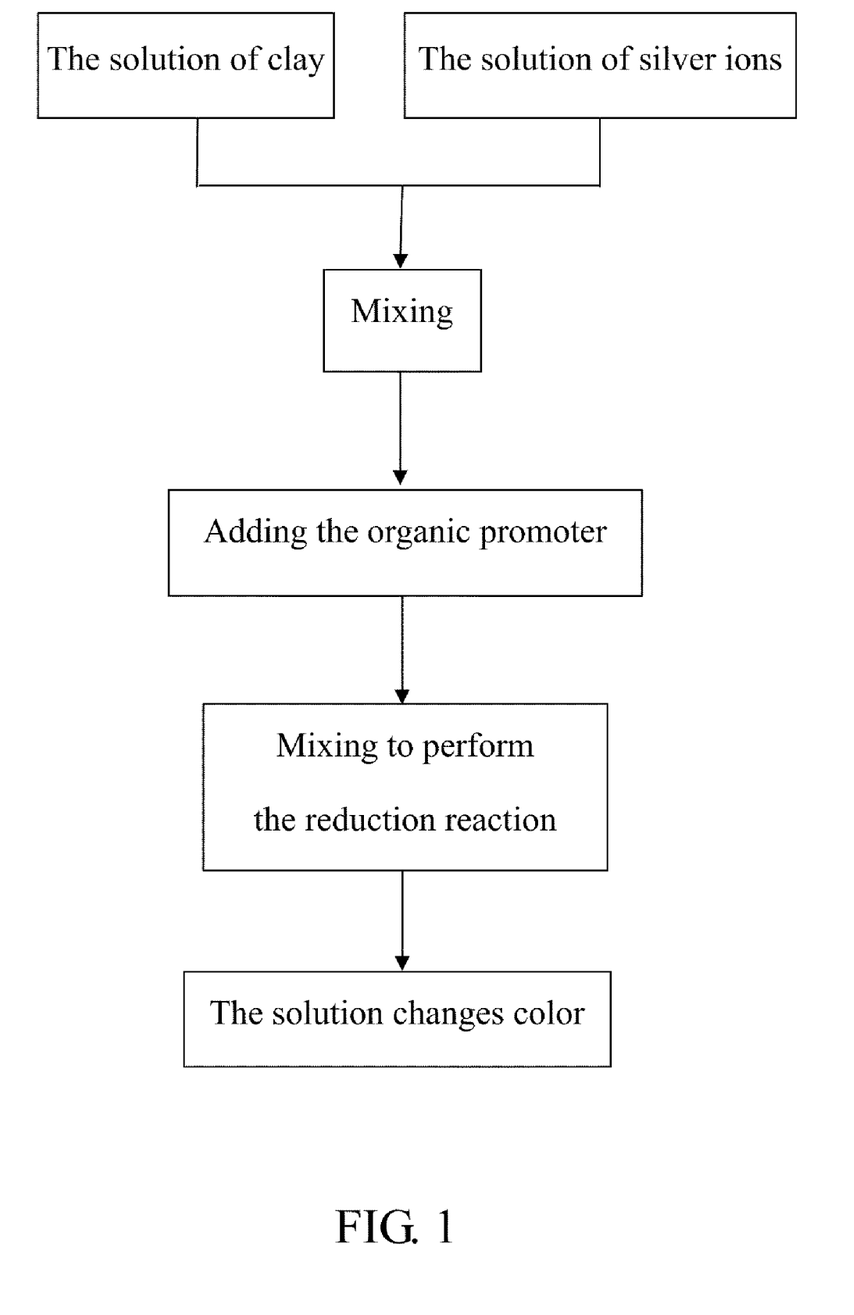
FIG. 1 shows the detailed procedure of the method according to the present invention.

The detailed procedure of the method according to the present invention is shown in FIG. 1. In the beginning, cations between the clay layers, for example, $Na^+$, are replaced with $Ag^+$, and negative charges are adsorbed onto the surfaces of the clay. The organic promoter facilitates to reduce $Ag^+$ into Ag atoms, which further aggregate into silver nanoparticles (AgNPs). The clay is suitable as carriers of the AgNPs due to its strong adsorption to silver, and because AgNPs do not easily attract to each other. The clay having steric hindrance can further avoid aggregation, and thus the AgNPs can be uniformly dispersed.

The main materials used in Examples and Comparative Examples of the present invention include:

1. Monoethanolamine (MEA): an organic promoter having the following structural formula:

2. Diethanolamine (DEA): an organic promoter having the following structural formulae:

3. Triethanolamine (TEA): an organic promoter having the following structural formulae:

4. Ethylenediamine (EDA): replacing the above organic promoters and used in Comparative Examples, having the following structural formulae:

5. Diglycolamine (DGA): replacing the above organic promoters and used in Comparative Examples, having the following structural formulae:

6. Laponite: layered silicate clay, having a structure with a ratio of Si-tetrahedron:Al-octahedron of about 2:1, CEC=0.69 meq/g, and acquired from Far Eastern Trading Co.
7. Silver nitrate: for replacing sodium ions between the clay layers and for reduction and aggregation into AgNPs; silver sulfate can be used, too.

Detailed procedure of Examples and Comparative Examples is described as follows and the operational conditions are shown in Attachment 1.

Example 1

(a) A solution of $AgNO_3$ (1 wt %, 3.51 g) was slowly added into a solution of Laponite (1 wt %, 30 g), $Ag^+/CEC=1.0$, and the solution became slightly yellow after being mixed for 30 seconds.
(b) The slightly yellow solution was continuously mixed in a water bath (45 to 50 degree C.).
(c) A solution of DEA (10 wt %, 0.5 g) was slowly added into the above solution and continuously mixed for 2 to 3 hours. The solution gradually became darker and finally a dark red-brown viscous liquid containing AgNPs was obtained. The liquid was then identified by UV absorption analysis.

Example 2

Repeat the procedure of Example 1, except that the water bath of step (b) was maintained at room temperature (about 25 to 30 degree C.) and the solution of step (c) was mixed for 5 to 6 hours. The solution containing AgNPs was also identified by UV absorption after being kept still for three days.

Example 3

Repeat the procedure of Example 1, except that the content of DEA of step (c) was changed to 1 g, and continuously mixed for 1.5 to 2 hours. The solution containing AgNPs was also identified by UV absorption.

Example 4

Repeat the procedure of Example 2, except that DEA of step (c) was replaced with MEA (10 wt %, 0.5 g), and continuously mixed for 5 to 6 hours. During the reaction, the solution became white and then darker. After being kept still for three days, the solution became red-brown and slightly viscous. The solution containing AgNPs was obtained and then identified by UV absorption.

Example 5

Repeat the procedure of Example 1, except that DEA of step (c) was replaced with MEA (10 wt %, 0.5 g), and continuously mixed for 4 to 5 hours. During the reaction, the solution became darker. Finally a red-brown and slightly viscous solution containing AgNPs was obtained and identified by UV absorption.

Example 6

Repeat the procedure of Example 1, except that DEA of step (c) was replaced with TEA (10 wt %, 1.0 g), and continuously mixed for 1.5 to 2 hours. During the reaction, the solution became darker. Finally a dark red-brown and slightly viscous solution containing AgNPs was obtained and identified by UV absorption.

Example 7

Repeat the procedure of Example 1, except that DEA of step (c) was replaced with TEA (10 wt %, 0.5 g), and continuously mixed for 2 to 3 hours. During the reaction, the solution became darker. Finally a dark red-brown slightly viscous solution containing AgNPs was obtained and identified by UV absorption.

Example 8

Repeat the procedure of Example 2, except that DEA of step (c) was replaced with TEA (10 wt %, 0.5 g), and continuously mixed for 5 to 6 hours. During the reaction, the solution became darker. Finally a dark red-brown and slightly viscous solution containing AgNPs was obtained and identified by UV absorption.

Comparative Example 1

Repeat the procedure of Example 1, except that DEA of step (c) was replaced with EDA (10 wt %, 1.0 g). During the reaction, the solution became white and then yellow. After being mixed for three hours and being kept still, the solution remained yellow and precipitated and no AgNPs were generated.

Comparative Example 2

Repeat the procedure of Example 1, except that DEA of step (c) was replaced with DGA (10 wt %, 1.0 g). During the reaction, the solution became white and then yellow. After being mixed for three hours, the solution remained yellow and no AgNPs were generated.

Comparative Example 3

(a) A solution of $AgNO_3$ (1 wt %, 3.51 g) was slowly added into a solution of Laponite (1 wt %, 30 g), $Ag^+/CEC=1.0$. After being mixed for 30 seconds, a slightly yellow mixture was generated. After being continuously mixed at room temperature for 24 hours, the mixture became slightly dark.
(b) The slightly yellow mixture was placed in a water bath (80 degree C.) and continuously mixed for 3 hours. A dark purple gel was obtained but no silver mirror or AgNPs occurred.

Comparative Example 4

(a) A solution of $AgNO_3$ (1 wt %, 1.14 g) was added into water (9.9 g).
(b) A solution of DEA (10 wt %, 0.4 g) was slowly added into the solution of step (a), and then mixed by ultrasonic oscillation for 1 hour. No AgNPs were generated.

Comparative Example 5

Repeat the procedure of Comparative Example 4, except that DEA of step (b) was replaced with TEA. No AgNPs were generated.

Comparative Example 6

Figure 2:
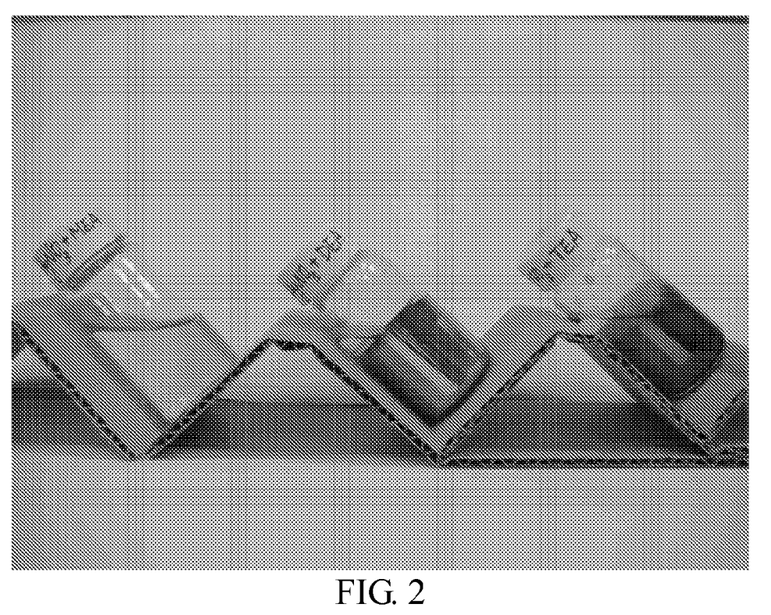
Figure 3:
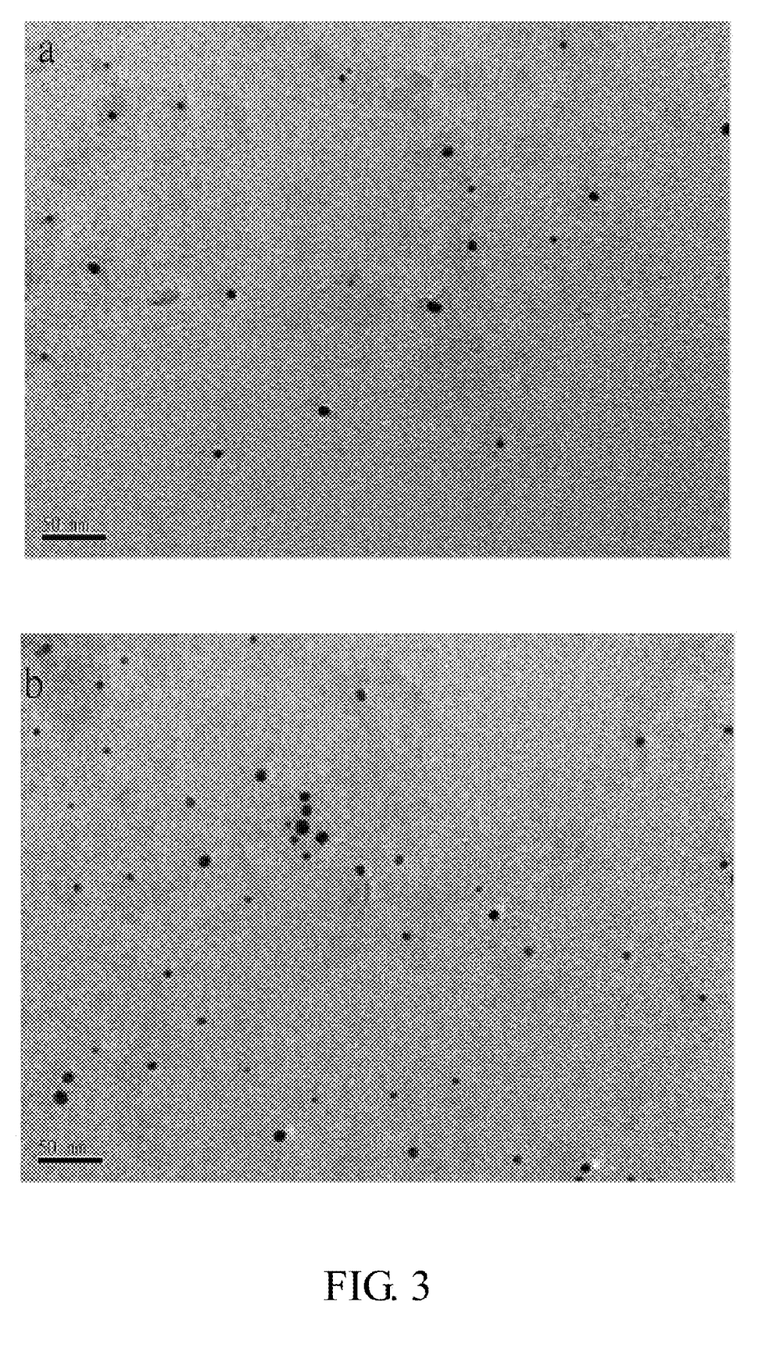
FIG. 3 shows the TEM images of the products of Examples 1 and 2 of the present invention.
Figure 4A:
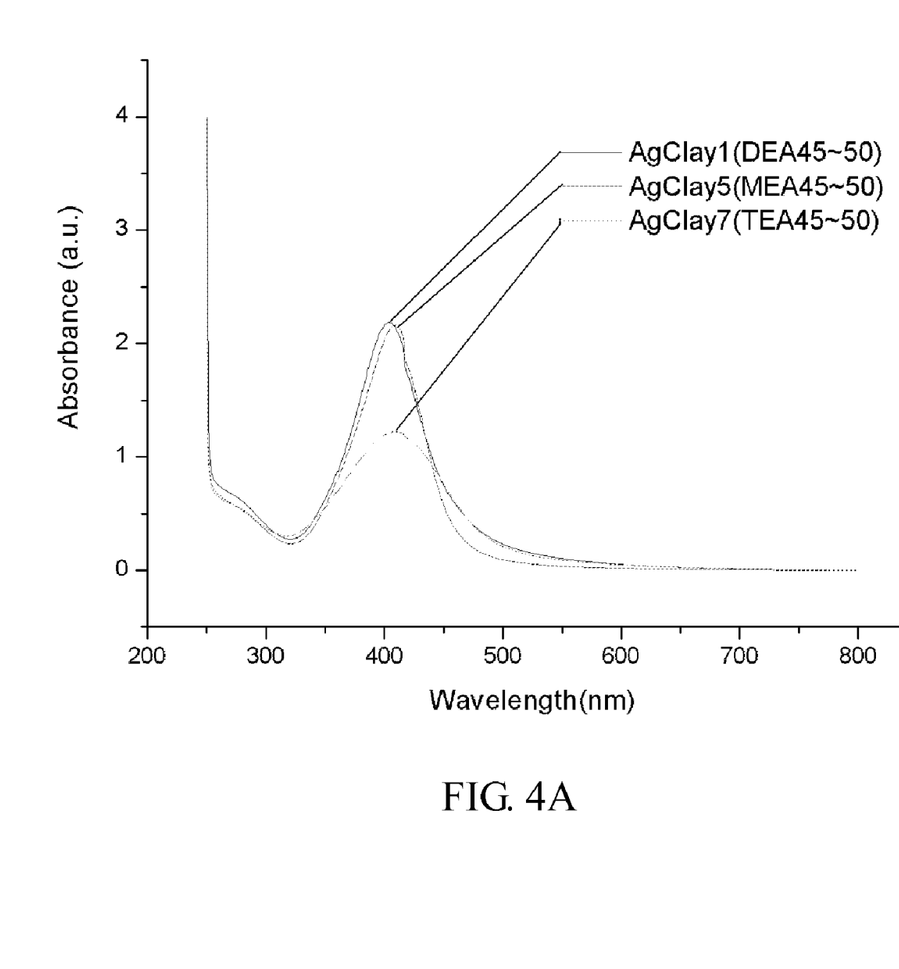
FIG. 4 shows the UV absorbance of the products of Examples 1 to 8.
Figure 4B:
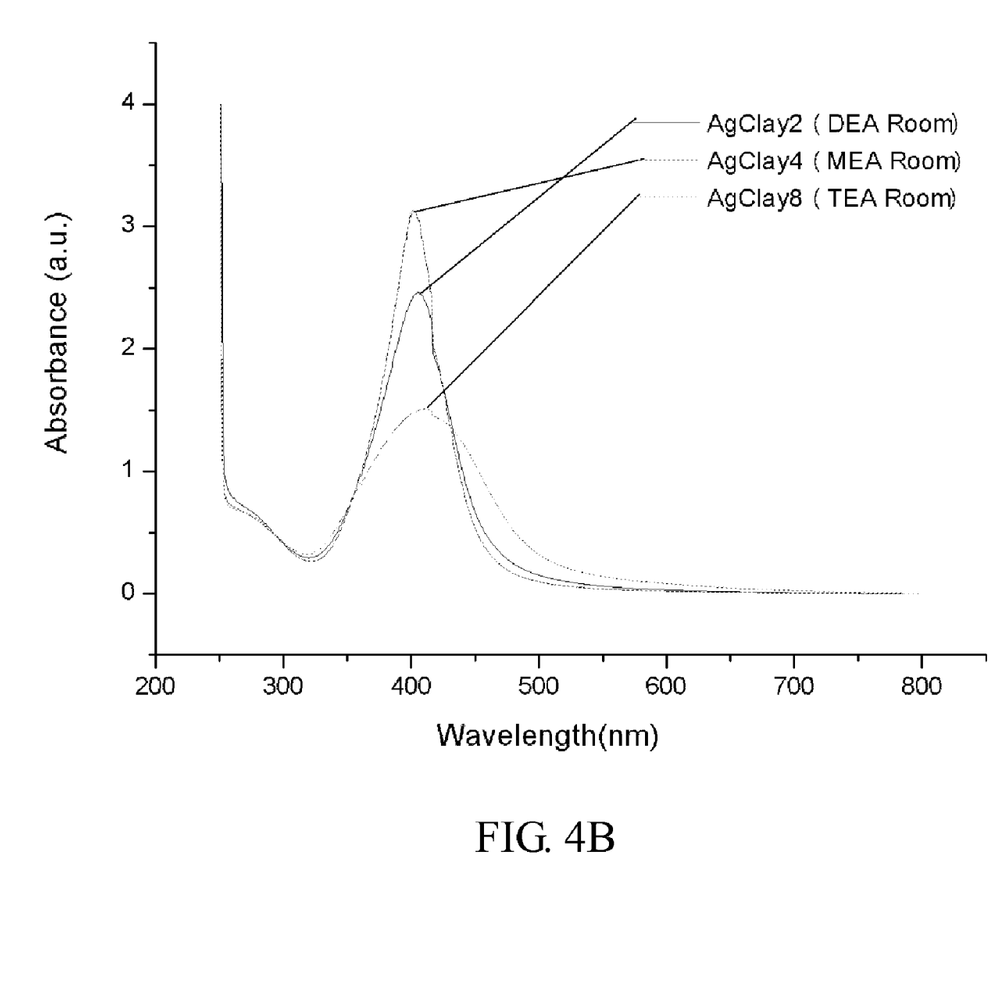
Figure 4C:
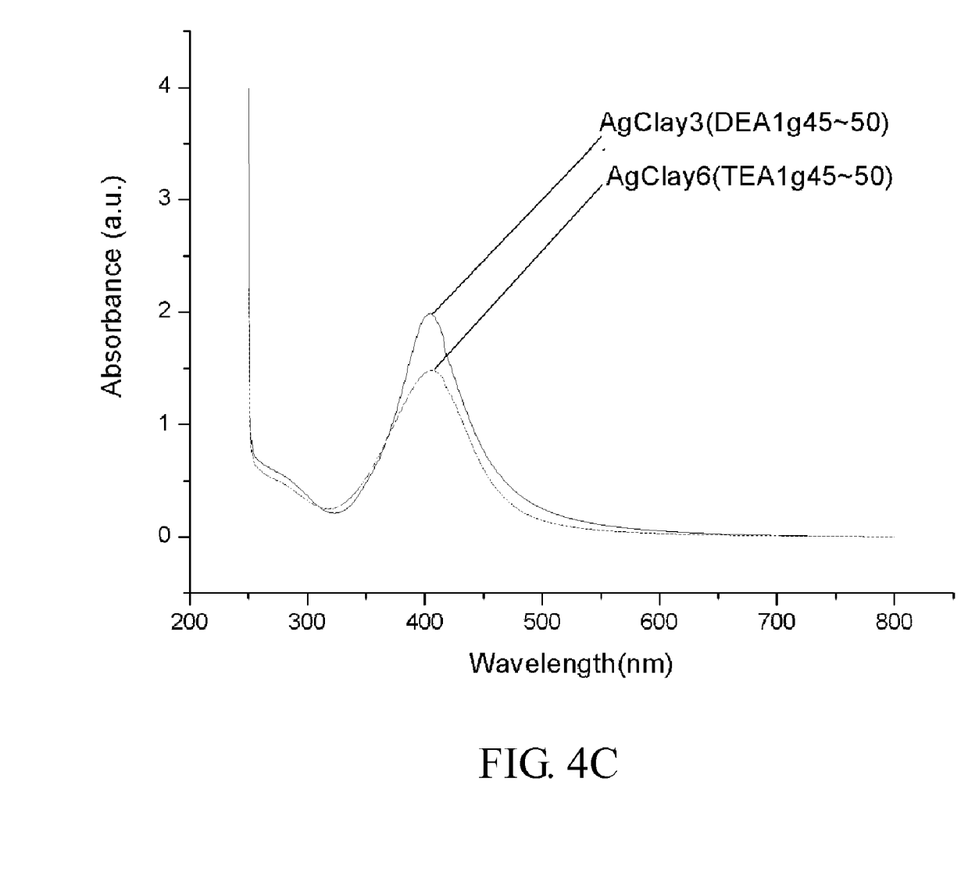

Repeat the procedure of Comparative Example 4, except that DEA of step (b) was replaced with MEA. No AgNPs were generated.
Analysis of Products
1. Silver Mirrors
The photograph of FIG. 2 showed the silver mirrors wherein the middle sample and the right sample were for Comparative Examples 4 and 5, respectively. The left sample was the slight silver mirror phenomenon of Comparative Example 6.
2. Particle Size Analysis
The products (0.5 g for each) of Examples 1 to 8 were respectively dropped on glass substrates (1×1 $cm^2$), and then dried in an oven at 80 degree C. for 2 hours. The dried substrates were plated with carbon for particle size analysis. Table 1 showed that all of the particles were in nano scale and ranged between 5 nm and 250 nm.
3. TEM Analysis
Silver particles obtained in Examples 1 and 2 were analyzed with the TEM (transmission electron microscopy). FIG. 3 showed the results wherein images a and b were for Examples 1 and 2, respectively. The particles were small and dispersed uniformly on the clay.
4. UV Analysis
In Examples 1 to 8, MEA, DEA and TEA were used as reducing agents to reduce silver ions into the AgNPs. These nanoparticles were then diluted and analyzed with UV absorption. FIG. 4 showed peaks around 400 nm, and Table 1 also showed such results. For Comparative Examples 1 and 2, no significant peak was observed and the colors of the products were different from others. Compared with the structures of EDA and DGA, that of DEA includes N and OH respectively on the C—C chain to form a five-membered ring with silver ions through steric orientation. Such intermediate product easily combined with silver ions to form AgNPs.
5. Stability Analysis
The product generated in the above preferred embodiments could be further heated to remove water to obtain AgNPs in the form of powders. By adding water into the powders, the original state of the product could be recovered. That is, these particles performed good stability. In addition, water and clay were used in the present invention as respectively the reacting media and the dispersant, and no organic solvents were involved. Therefore, environmental pollution could be avoided.

In the present invention, small amounts of the promoters are able to cause good reductive effects, and the AgNPs can be generated without expensive equipment. Sources of the silver ions are not limited to silver nitrate. $AgBrO_3$, AgBr, AgCl, $AgClO_3$, etc. can be used as sources of the silver.

Compared with the conventional processes, the method of the present invention can be carried out faster at moderate temperatures (25 to 50 degree C.); and the AgNPs (ranging between 5 nm and 250 nm in particle size) can be stably dispersed in a water solution containing inorganic clay. As no organic dispersant is used, the AgNPs can be easily further prepared at high concentrations (1 to 10 wt %), in the form of gel or solid powders.

| Attachment 1 | | | | | | | |
|---|---|---|---|---|---|---|---|
| Example/ Comparative Example | Reducing agent | Reducer/ AgNp/clay (w/w/w) | Reaction temperature ( ) | Reaction time (hours) | Color of the solution | UV (nm) | Particle size (nm) |
| Example 1 | DEA | 13.5/5.9/80.6 | 45~50 | 2~3 | Dark red-brown | 402 | 5~10 |
| Example 2 | DEA | 13.5/5.9/80.6 | 25~30 | 5~6 | Dark red-brown | 405 | 10~20 |
| Example 3 | DEA | 23.7/5.2/71.1 | 45~50 | 2 | Dark red-brown | 401 | 250 |
| Example 4 | MEA | 13.5/5.9/80.6 | 25~30 | 5~6 | Red-brown | 405 | 20~25 |
| Example 5 | MEA | 13.5/5.9/80.6 | 45~50 | 4~5 | Red-brown | 411 | 35~45 |
| Example 6 | TEA | 23.7/5.2/71.1 | 45~50 | 2 | Dark red-brown | 404 | 30~40 |
| Example 7 | TEA | 13.5/5.9/80.6 | 45~50 | 2~3 | Dark red-brown | 410 | 5~10 |
| Example 8 | TEA | 13.5/5.9/80.6 | 25~30 | 5~6 | Dark red-brown | 411 | 70~80 |
| Comparative Example 1 | EDA | 23.7/5.2/71.1 | 45~50 | 3 | Yellow | No peak | — |
| Comparative Example 2 | DGA | 23.7/5.2/71.1 | 45~50 | 2 | Lightly yellow | No peak | — |

-continued

Attachment 1

| Example/<br>Comparative Example | Reducing<br>agent | Reducer/<br>AgNp/clay<br>(w/w/w) | Reaction<br>temperature<br>() | Reaction<br>time<br>(hours) | Color of<br>the solution | UV (nm) | Particle<br>size<br>(nm) |
|---|---|---|---|---|---|---|---|
| Comparative Example 3 | none | 0/7/93 | 25~30 | 27 | Dark purple | No peak | — |
| Comparative Example 4 | DEA | 77.8/22.2/0 | 25~30 | 1 | Silver mirror | No peak | — |

What is claimed is:

1. A method for producing a complex of metallic nanoparticles and inorganic clay; comprising a step of:
   mixing a metal ionic compound, layered inorganic clay and an organic promoter to perform a reduction reaction in water at 45 to 50° C. for 0.5 to 24 hours;
   wherein said inorganic clay is silicate clay, said metal ionic compound is silver nitrate and said organic promoter is selected from the group consisting of monoethanolamine (MEA), diethanolamine (DEA) and triethanolamine (TEA), with the weight ratio of said silver nitrate to said organic promoter being 1:1 to 1:3;
   whereby said organic promoter reduces metal ions in the metal ionic compound into metal atoms which then aggregate into metallic nanoparticles to form a complex of said metallic nanoparticles and inorganic clay.

2. The method of claim 1, wherein said organic promoter has a concentration ranging from 5 to 50wt %.

3. The method of claim 1, wherein the weight ratio of said silver nitrate to said inorganic clay is 1:100 to 1:2.

4. The method of claim 1, wherein said silver nitrate has a concentration ranging from 0.5 to 5 wt %.

5. The method of claim 1, wherein said inorganic clay is montmorillonite (MMT), bentonite, laponite, sunthetical mica, kaolinite, talc, attapulgite clay, vermiculite or layered double hydroxides (LDH).

6. The method of claim 1, wherein said inorganic clay is layered inorganic clay having an aspect ratio ranging from 10 to 100,000.

7. The method of claim 1, wherein said inorganic clay is layered inorganic clay having an aspect ratio ranging from 100 to 1,000.

8. The method of claim 1, wherein said inorganic clay has a ratio of Si-tetrahedron:Al-octahedron about 2:1.

9. The method of claim 1, wherein the ratio of the ionic equivalent of said metallic nanoparticles to the cationic exchanging equivalent of said layered inorganic clay is 0.1 to 200.

10. The method of claim 1, wherein said layered inorganic clay has a cationic exchanging equivalent ranging from 0.1 to 5.0 meq/g.

11. The method of claim 1, wherein said layered inorganic clay has a concentration ranging from 0.5 to 5 wt %.

* * * * *